United States Patent
Miyake

(10) Patent No.: US 8,825,086 B2
(45) Date of Patent: Sep. 2, 2014

(54) DIRECTION DISPLAY DEVICE AND DIRECTION DISPLAY SYSTEM

(71) Applicant: Casio Computer Co., Ltd., Tokyo (JP)

(72) Inventor: Takeshi Miyake, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/926,770

(22) Filed: Jun. 25, 2013

(65) Prior Publication Data

US 2014/0011540 A1    Jan. 9, 2014

(30) Foreign Application Priority Data

Jul. 5, 2012    (JP) .................................. 2012-151017

(51) Int. Cl.
| | |
|---|---|
| *H04W 24/00* | (2009.01) |
| *G01C 21/08* | (2006.01) |
| *G01C 5/06* | (2006.01) |
| *G01C 17/00* | (2006.01) |
| *H04M 3/42* | (2006.01) |

(52) U.S. Cl.
CPC ............... *H01W 4/008* (2013.01); *G01C 21/08* (2013.01); *G01C 5/06* (2013.01); *G01C 17/00* (2013.01)
USPC ........................................ 455/456.3; 701/400

(58) Field of Classification Search
USPC ........................................ 455/456.3; 701/400
See application file for complete search history.

(56) References Cited

U.S. PATENT DOCUMENTS

| | | | |
|---|---|---|---|
| 2006/0089786 A1* | 4/2006 | Soehren | 701/200 |
| 2012/0316777 A1* | 12/2012 | Kitta | 701/431 |

FOREIGN PATENT DOCUMENTS

JP    2009-118403 A    5/2009

\* cited by examiner

*Primary Examiner* — Lee Nguyen
(74) *Attorney, Agent, or Firm* — Holtz Holtz Goodman & Chick PC

(57) ABSTRACT

The direction display device includes: a wireless communication section to perform near field wireless communication; a barometric pressure measuring section; a converting section to convert barometric pressure into altitude; an orientation measuring section to measure an orientation of a specified direction; an operation section; a display section; a registration controlling section to obtain current positional information from an external positioning device on the basis of a registration instruction of the measured orientation to store the current positional information as registered positional information so as to be correlated to registered orientation information; a registration position extracting section to extract the registered positional information including an altitude value whose difference from the converted altitude is within a predetermined range; and a display controlling section to cause the display section to indicate a direction regarding the registered orientation correlated to the registered positional information.

20 Claims, 11 Drawing Sheets

DIRECTION DISPLAY DEVICE AND DIRECTION DISPLAY SYSTEM

CROSS-REFERENCE TO RELATED APPLICATIONS

This application is based upon and claims the benefit of priority from the prior Japanese Patent Application No. 2012-151017 filed on Jul. 5, 2012, the entire contents of which are incorporated herein by reference.

FIELD OF THE INVENTION

The present invention relates to a direction display device and a direction display system.

BACKGROUND OF THE INVENTION

Heretofore, there has been an electronic device, including an electronic wrist watch for example, by which orientation measurement using an orientation sensor and/or altitude measurement using a barometric pressure sensor can be conducted and which can easily be taken along and browsed at while being worn on a wrist. A user can easily obtain information of orientation and/or altitude in a mountain road or the like by using the electronic device equipped with such sensor(s). Among such devices, there has been an electronic device which can perform an informing operation when reaching a previously-set altitude. By the informing operation, a user can easily recognize that he has reached the set altitude.

However, many of mountain roads include not only simple ascent/descent, but also intricate up/down roads along the way. For this reason, there is a problem that an intended spot cannot always be specified by performing only the altitude measurement. Moreover, the orientation sensor of the electronic device is used in the same manner as an ordinary compass, and a user needs to refer to map information to make a judgment in order to obtain course information.

Meanwhile, there has recently been portable electronics, such as a smartphone, having various functions in addition to a telephone function and an email transmitting/receiving function. Some electronics have, among the various functions, a Global Positioning System (GPS) positioning function to obtain positional information using the GPS. A user can easily obtain the positional information including altitude information and/or route navigation information by using these electronics. However, these electronics are sometimes not suitable for being continuously used by being held in a hand or the like, because of their size and/or shape. Also it is sometimes not preferable to use these electronics in a state of being exposed outwardly in view of a balance between the GPS function and the other functions, or because of problems on waterproof property, durability, etc.

Therefore, there has been developed a technique to use near field communication such as Bluetooth (registered mark) to continually conduct communication between these electronics and the electronic wristwatch, and to cause a display section of the electronic wristwatch to display necessary information transmitted from the electronics for utilizing the information (for example, see Japanese Patent Application Laid-Open Publication No. 2009-118403).

However, it is not always necessary to browse continuous positioning information in the mountain roads, while the mountain roads often include an intricate/complicated climbing trail and/or branch thereof. In such case, the above technique sometimes cannot sufficiently deal with displaying the course only by using the map information.

SUMMARY

The object of the present invention is to provide a direction display device and a direction display system which can easily indicate direction/orientation information at a necessary spot(s).

To achieve the object of the present invention, according to an aspect of the present invention, there is provided a direction display device including: a wireless communication section to perform near field wireless communication with an external device; a barometric pressure measuring section to measure barometric pressure; a converting section to convert the barometric pressure measured by the barometric pressure measuring section into an altitude value; an orientation measuring section to measure an orientation of a specified direction; an operation section to receive an input operation; a display section to display information; a registration controlling section to obtain current positional information by the wireless communication section from an external positioning device to store the current positional information as registered positional information while correlating the current positional information to registered orientation information which is of the measured orientation, when the input operation of registration instruction of measured orientation has been detected; a registration position extracting section to extract the registered positional information according to which a difference between the altitude value converted by the converting section and an altitude value obtained from the registered positional information stored is within a predetermined range; and a display controlling section to cause, when one or more pieces of the registered positional information has been extracted by the registration position extracting section, the display section to indicate a direction regarding the registered orientation information stored so as to be correlated to the registered positional information, according to the current position measured by the positioning device and a position regarding the registered positional information extracted.

BRIEF DESCRIPTION OF THE DRAWINGS

A more complete understanding of this application can be obtained when the following detailed description is considered in conjunction with the following drawings, in which.

DETAILED DESCRIPTION

Hereinafter, embodiment of the present invention will be described with reference to the drawings.

First Embodiment

Figure 1:
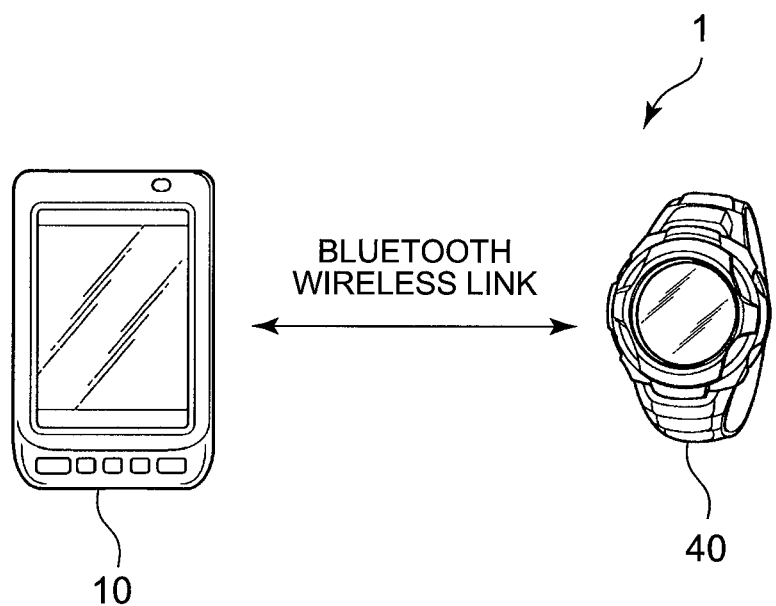
FIG. 1 is an overall view illustrating an embodiment of a direction display system of the present invention.

FIG. 1 is an overall view of a direction display system 1 according to a first embodiment of the present invention.

The direction display system 1 of the embodiment is constituted to include an electronic timepiece 40 as a direction display device, and a smartphone 10 as a positioning device. The electronic timepiece 40 is equipped with a timepiece body and a band, and is a wrist-watch type wearable on a wrist. Both of the electronic timepiece 40 and the smartphone 10 have near field communication functions, and can communicate with each other by Bluetooth communication, for example. The smartphone 10 is carried by a user, who wears the electronic timepiece 40, while being put in a backpack, bag, or pocket.

Figure 2:
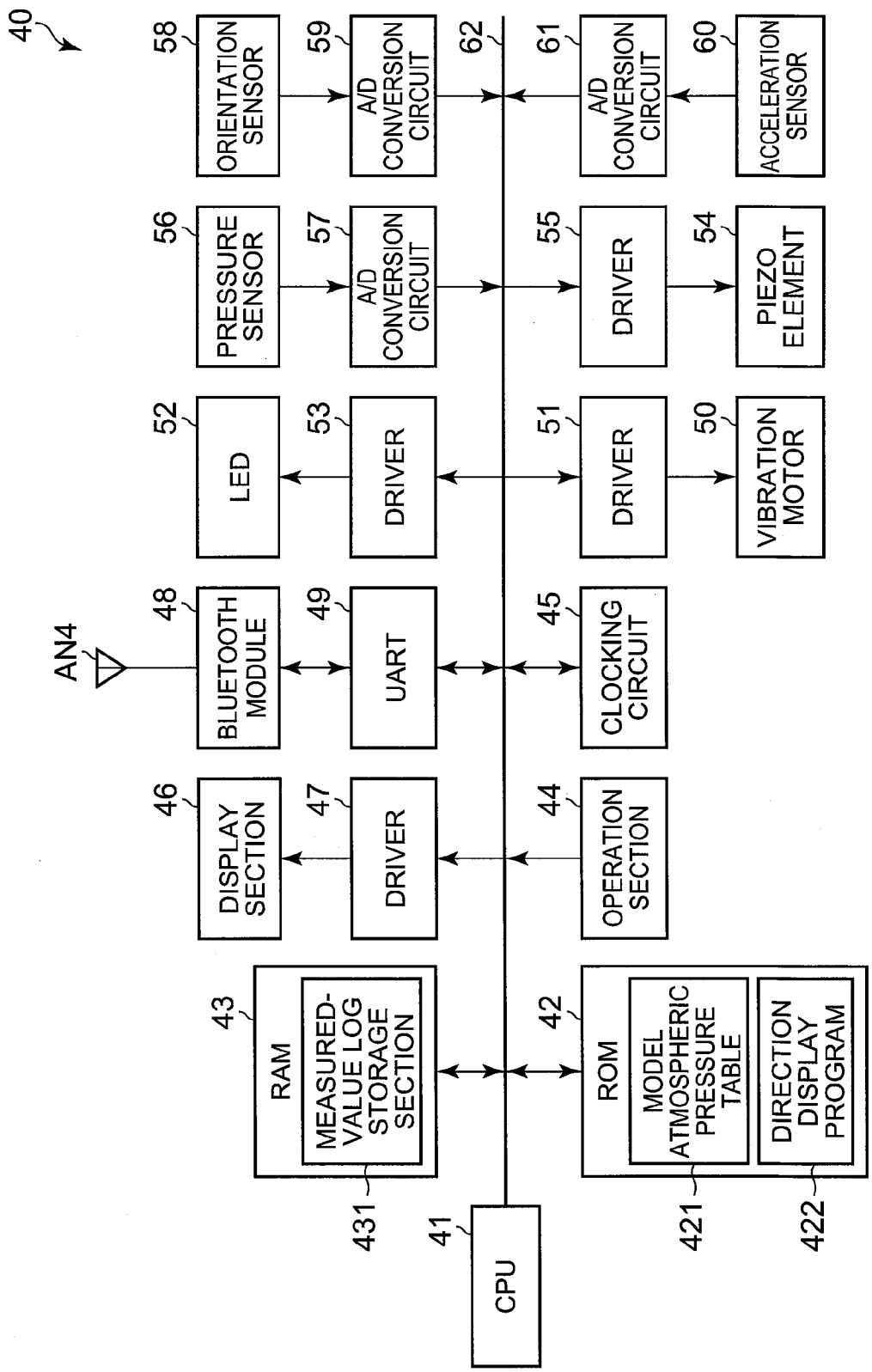
FIG. 2 is a block diagram illustrating an internal configuration of an electronic timepiece.
Figure 3:
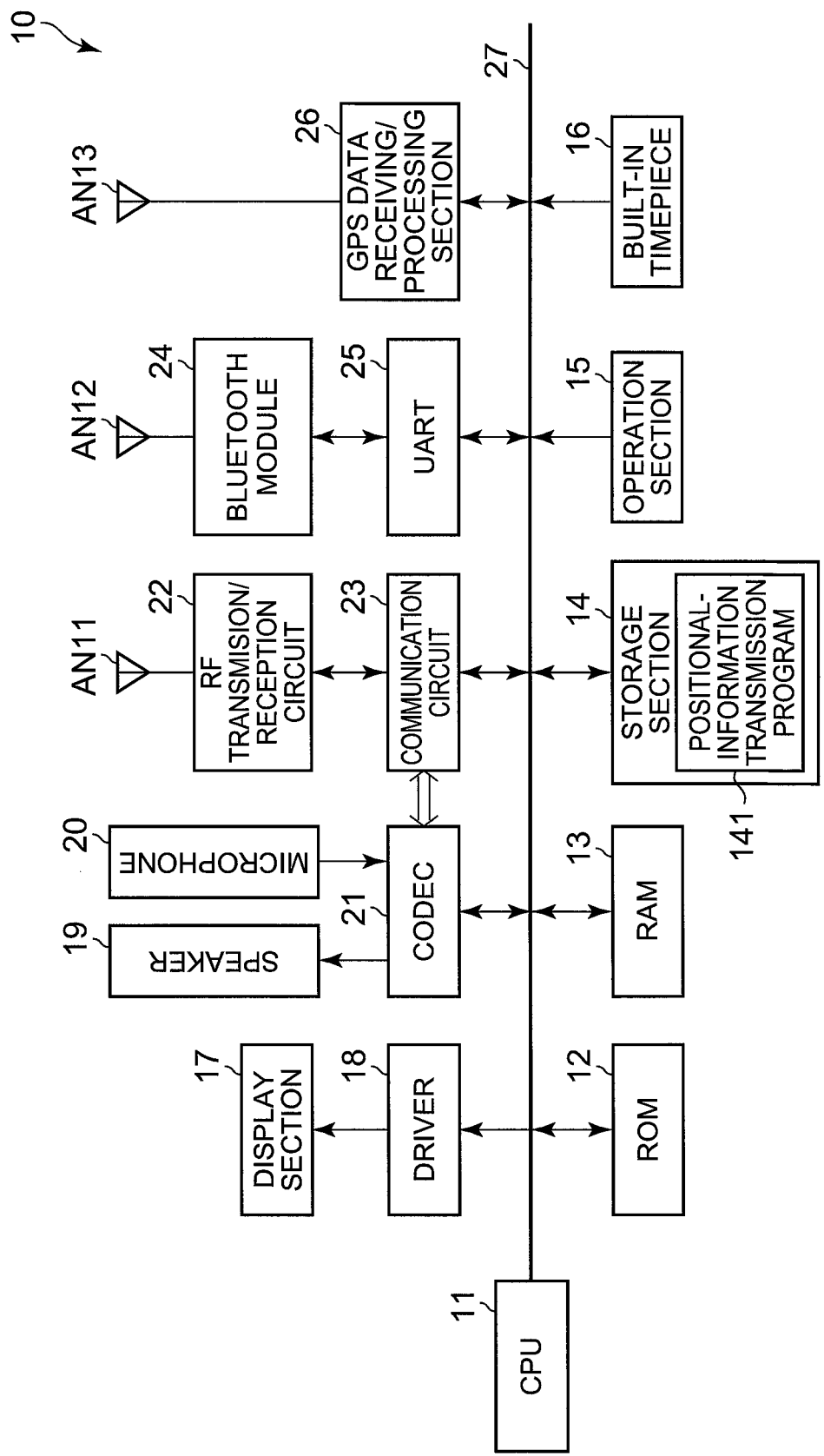
FIG. 3 is a block diagram illustrating an internal configuration of a smartphone according to a first embodiment.

FIG. 2 is a block diagram illustrating an internal configuration of the electronic timepiece 40. FIG. 3 is a block diagram illustrating an internal configuration of the smartphone 10.

As illustrated in FIG. 2, the electronic timepiece 40 includes: a Central Processing Unit (CPU) 41 (a registration instruction detecting section, a registration controlling section, a registration position extracting section, a display controlling section, a position agreement judging section, a direction display controlling section, a position confirming section, and a input/output switch controlling section); a Read Only Memory (ROM) 42; a Random Access Memory (RAM) 43 (a storage section); an operation section 44 (an operation section); a clocking circuit 45; a display section 46 (a display section) and a driver 47 which drives/controls the display section 46; an antenna AN4; a Bluetooth module 48 and a Universal Asynchronous Receiver Transmitter (UART) 49 as a wireless communication section; a vibration motor 50 and a driver 51 for the vibration motor 50; an LED (light-emitting diode) 52 and a driver 53 for the LED 52; a piezo element 54 and a driver 55 for the piezo element 54; a pressure sensor 56 as a barometric pressure measuring section and an A/D conversion circuit 57 for converting data output from the pressure sensor 56; an orientation sensor 58 as an orientation measuring section and an A/D conversion circuit 59 for converting data output from the orientation sensor 58; an acceleration sensor 60 and an A/D conversion circuit 61 for converting data output from the acceleration sensor 60; and bus 62 which enables transmission/reception of signals between the CPU 41 and each of the sections. The vibration motor 50, the LED 52, and the piezo element 54 constitute an informing section.

The CPU 41 performs integrated control of overall operation of the electronic timepiece 40 and various arithmetic processing. The CPU 41 causes the display section 46 to perform time display on the basis of the current time counted by the clocking circuit 45. The CPU 41 is configured to calculate an altitude on the basis of barometric pressure data obtained by the pressure sensor 56, and configured to be able to obtain predetermined positional information from the smartphone 10 through the Bluetooth module 48. The CPU 41 also detects a posture/orientation of the electronic timepiece 40 on the basis of measurement data obtained by the orientation sensor 58 and the acceleration sensor 60. The CPU 41 can be configured to be able to approximate an azimuth of a moving direction of a user from the measurement data.

The ROM 42 stores various programs and default setting data to be executed by the CPU 41. The data stored in the ROM 42 includes a model atmospheric pressure table 421 and a direction display program 422. The model atmospheric pressure table 421 and the direction display program 422 constitute a converting section.

The RAM 43 provides the CPU 41 with a working memory space. The RAM 43 also includes a measured-value log storage section 431, and sequentially stores the azimuth of a predetermined direction calculated from the data measured by the orientation sensor 58 and the acceleration sensor 60 at the timing specified on the basis of the registration instruction, and data correlated to the azimuth.

The operation section 44 is equipped with one or a plurality of button switch, and converts an operation into an input signal, which operation is conducted by a user with respect to the switch, to output the input signal to the CPU 41. Alternatively, the operation section 44 can be a touch panel.

The clocking circuit 45 is a counter which counts the current time to hold the same. This counter can be a RAM which merely stores current-time information. The current time is read out to be displayed in the display section 46, and/or the current time is compared with set time data regarding various functions to perform various operations.

The display section 46 is a Liquid Crystal Display (LCD) of dot matrix display system, for example. The driver (liquid crystal driver) 47 operates by a control signal transmitted from the CPU 41 to drive the LCD so as to perform a display regarding a specified content such as the current time, setting state, and menu of various functions. The display section 46 can be another display section, for example, an organic Electro-Luminescent Display (ELD), and the driver 47 is arbitrary selected depending on the type of the display section 46. Alternatively, the electronic timepiece 40 can be an analog type, and the display section 46 can include a dial face with a scale thereon, and a plurality of hands each of which rotates above the dial face.

The Bluetooth module 48 is a control module for performing Bluetooth communication between the electronic timepiece 40 and an external device(s). As the Bluetooth communication performed by the Bluetooth module 48, also a low-power-consumption standard (Bluetooth Low Energy) can be used. The DART 49 performs processing such as serial/parallel conversion with respect to transmission data transmitted from the CPU 41, and transmits the data from the Bluetooth module 48 to the external device. The UART 49 also performs processing such as serial/parallel conversion with respect to reception data received from the external device via the Bluetooth module 48, and transmits the data to the CPU 41.

The vibration motor 50, the LED 52, and the piezo element 54 perform informing operations for a user by emitting vibration, light, and a sound respectively. When the CPU 41 transmits control signals to the drivers 51, 53 and 55, the drivers 51, 53 and 55 convert the control signals into voltage signals necessary for operating the vibration motor 50, the LED 52, and the piezo element 54, and output the voltage signals, respectively.

As shown in FIG. 3, the smartphone 10 includes: a CPU 11 (a positioning controlling section, a first positioning controlling section, and a second positioning controlling section); a ROM 12; a RAM 13; a storage section 14 as an external storage section; an operation section 15; a built-in timepiece 16; a display section 17 and a driver 18 for the display section 17; a speaker 19; a microphone 20; a codec 21, an RF transmission/reception circuit 22; an antenna AN11 for RF transmission/reception; a communication circuit 23; a Bluetooth module 24 as an external communication section; a Universal Asynchronous Receiver Transmitter (UART) 25; an antenna AN12 for transmission/reception in Bluetooth communication; a GPS data receiving/processing section 26 as a positioning section; an antenna AN13 for receiving GPS data; and a bus 27 which connects the CPU 11 and each of the sections.

The CPU 11 performs integrated control of overall operation of the smartphone 10 and various arithmetic processing. The GPU 11 also transmits a control signal(s) to the Bluetooth module 24 on the basis of the information set by inputting operation in the operation section 15 so as to cause the electronic timepiece 40 to transmit the positional information based on the GPS positioning data.

The ROM 12 stores various programs and default setting data to be executed by the CPU 11. The RAM 13 provides the CPU 11 with a working memory space, and stores temporary work data.

The storage section 14 is a readable/writable nonvolatile memory, and is composed of a flash memory or Electrically Erasable and Programmable Read Only Memory (EEPROM), for example. The storage section 14 stores various application programs to be executed in the smartphone 10, and save data and/or set data regarding various functions. The application programs include a positional-information transmission program 141 for outputting the positional information requested from the electronic timepiece 40, in a previously-set format, to the electronic timepiece 40 through the Bluetooth module 24 by Bluetooth communication.

The operation section 15 is an input detecting section which detects an input to the touch panel, namely, an input operation in the display section 17. The operation section 15 converts the operation input by the user into an electric signal, and outputs to the CPU 11 the electric signal as an input signal which corresponds to a menu displayed in the display section 17, and to a position and content of the input operation. Additionally, the operation section 15 can include one or a plurality of operation keys and have a configuration to output to the CPU 11 the input signal which is the electric signal obtained by converting the key operation executed by a user.

The built-in timepiece 16 is a counter which counts the current time to hold the same. In the smartphone 10, the current time is read out to be displayed in the display section 17. The current time is also compared with the set time data regarding the various functions to perform the various operations. The current time held by the built-in timepiece 16 is continually corrected when communicating with a portable base station using the RF transmission/reception circuit 22.

The display section 17 is composed of a Liquid Crystal Display (LCD), for example. The driver (liquid crystal driver) 18 operates by a control signal transmitted from the CPU 11 to drive the LCD so as to perform a display(s) regarding various functions of the smartphone 10. The display section 17 can adopt another display system, for example, an organic Electro-Luminescent Display (ELD). The driver 18 is arbitrary selected depending on the display system. The display section 17 performs the display of menu, as an input screen of the touch panel, for receiving the input operation by a user.

The speaker 19 converts an electric signal into an audio signal on the basis of a signal from the codec 21 to output audio. The microphone 20 detects sound wave to convert it into an electric signal, and outputs it to the codec 21. The codec 21 decodes a compression-coded digital audio signal to transmit it as an analog signal to the speaker 19, and also encodes the audio signal input from the microphone 20 to output it to the CPU 11 and/or the communication circuit 23. Alternatively, a speaker for talking can be provided separately from a speaker for outputting the audio outside of the smartphone 10.

The RF transmission/reception circuit 22 performs processing regarding transmission/reception of packet data of telephone audio data, electric mail, etc., which transmission/reception is performed by using the RF transmission/reception antenna AN11 between the smartphone 10 and the portable base station. The communication circuit 23 performs various processing to the data transmitted/received by the RF transmission/reception circuit 22, and performs delivery/receipt of the data to/from the CPU 11 and/or the codec 21.

The Bluetooth module 24 is a control module for performing Bluetooth communication between the smartphone 10 and the other electronics such as the electronic timepiece 40 through the antenna AN 12. The UART 25 performs processing such as serial-parallel conversion to the transmission data sent from the CPU 11 to transmit it to the other electronics from the Bluetooth module 24. The UART 25 also performs processing such as serial-parallel conversion to the reception data received using the Bluetooth module 24 from the other electronics to output it to the CPU 11.

The GPS data receiving/processing section 26 demodulates and decodes a satellite signal received from a plurality of GPS satellites through the antenna AN13 to convert it into time data and/or positional data to output it in a predetermined format to the CPU 11. As the predetermined format for data output, National Marine Electronics Association (NMEA)-0183 is used, for example.

Next, registration of the measurement data and operations regarding the direction display based on the registered data in the electronic timepiece 40 according to the embodiment will be described.

Figure 4:
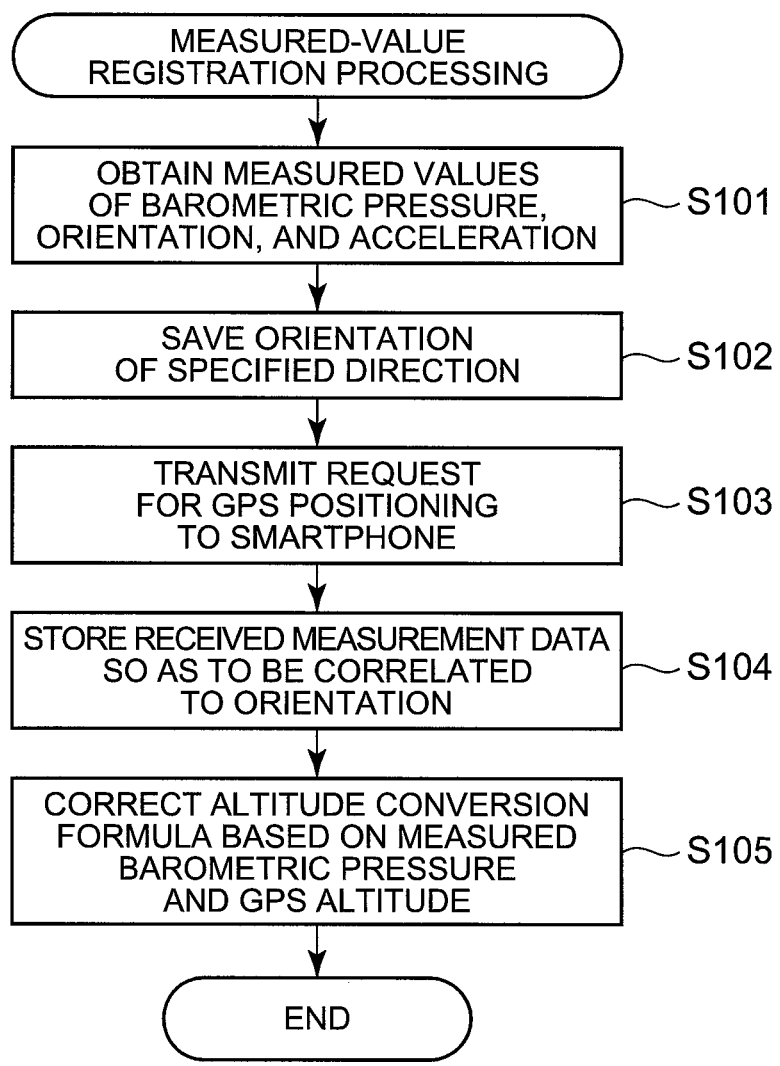
FIG. 4 is a flowchart illustrating a control procedure of measured-value registration processing in the electronic timepiece according to the first embodiment.

FIG. 4 is a flowchart illustrating a control procedure of measured-value registration processing by the CPU 41 to be executed in the electronic timepiece 40 of the embodiment. The execution of the measured-value registration processing is started on the basis of a predetermined input operation by a user in the operation section 44 in the case that the user wishes to register a direction/orientation at an intended spot when ascending (up) a mountain.

The CPU 41 firstly obtains measured values from the pressure sensor 56, the orientation sensor 58 and the acceleration sensor 60 (Step S101). Then, the CPU 41 calculates an orientation of a predetermined reference direction of the electronic timepiece 40, and causes the measured-value log storage section 431 to store the orientation (Step S102). The predetermined reference direction is previously set, which is for example the twelve o'clock direction/position (the direction toward the upper portion of the display section 46) in relation to the center position of the display section 46. A user can save the azimuth of an intended direction as registered orientation information by executing a predetermined operation in the operation section 44 while directing the electronic timepiece 40 toward the intended direction.

The CPU 41 then transmits a request for executing GPS positioning to the smartphone 10 through the Bluetooth module 48 (Step S103). The CPU 41 waits until it receives predetermined positioning data (current positional information)

based on the positioning result from the smartphone 10, and causes the measured-value log storage section 431 to store the received positioning data and the azimuth data previously stored as the registered orientation information, while correlating the positioning data and the azimuth data to each other (Step S104). In the direction display system 1 of the embodiment, the positioning data to be stored at this time includes both of plane coordinates and altitude value(s).

After that, the CPU 41 sets a correction parameter(s) for a conversion formula (s) from the barometric pressure to the altitude using the model atmospheric pressure table 421 on the basis of the altitude data included in the registered positional information and the barometric pressure value measured by the pressure sensor (Step S105). Then, the CPU 41 terminates the measured-value registration processing.

The measured-value log storage section 431 can store the pieces of data of multiple times of the measured-value registration processing, and a user can repeatedly invoke the measured-value registration processing at an intended spot to sequentially store the registered orientation information and the registered positional information.

Figure 5:
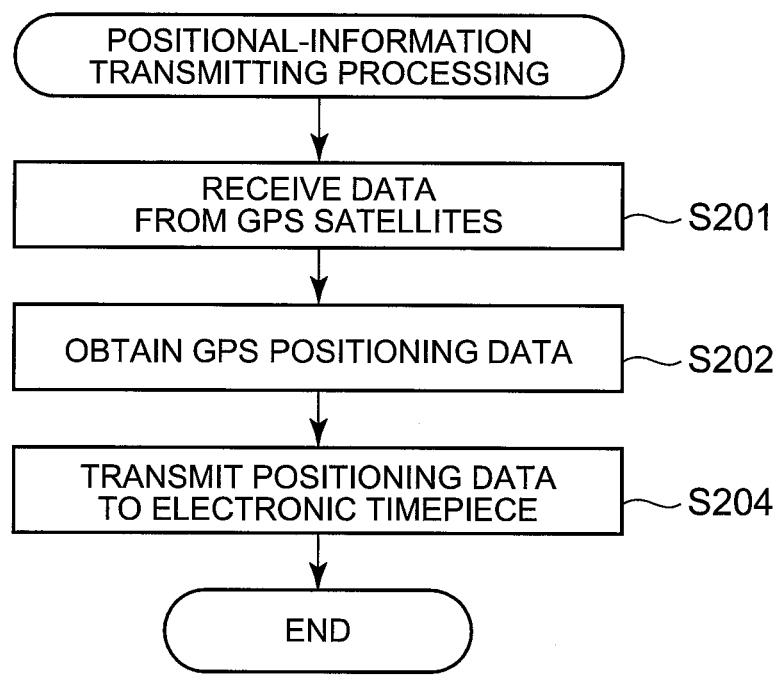
FIG. 5 is a flowchart illustrating a control procedure of positional-information transmitting processing in the smartphone according to the first embodiment.

FIG. 5 is a flowchart illustrating a control procedure by the CPU 11 for positional-information transmitting processing to be executed in the smartphone 10.

The positional-information transmitting processing is started when the smartphone 10 receives the request for GPS positioning transmitted from the electronic timepiece 40 in Step S103 of the measured-value registration processing executed in the electronic timepiece 40 and the positional-information transmission program 141 is read out and executed. When the positional-information transmitting processing is started, the CPU 11 causes the GPS data receiving/processing section 26 to operate to receive radio wave from the GPS satellite(s) and calculate the current location (Step S201). Then, the CPU 11 obtains the necessary positioning data (current positional information) from among the pieces of data output from the GPS data receiving/processing section 26 (Step S202), and transmits the positioning data to the electronic timepiece 40 through the Bluetooth module 24 (Step S204). After that, the CPU 11 terminates the positional-information transmitting processing.

Incidentally, in the case that the smartphone 10 intermittently (for example, at predetermined intervals) performs the GPS positioning regardless of the instruction from the electronic timepiece 40, when the GPS positioning has been performed since the start of the processing of Step S201 up to a predetermined time before (for example, twenty to thirty seconds before), a user can use the last positioning data without performing the GPS positioning separately. In other words, the current positional data necessary at this point can include a time lag between obtaining timings within a range not causing a relatively large error compared with an amount (for example, 15 to 30 meters) of measurement errors in the pressure sensor and the GPS positioning, and compared with a moving speed (for example, 1 m/s) of a user.

Figure 6:
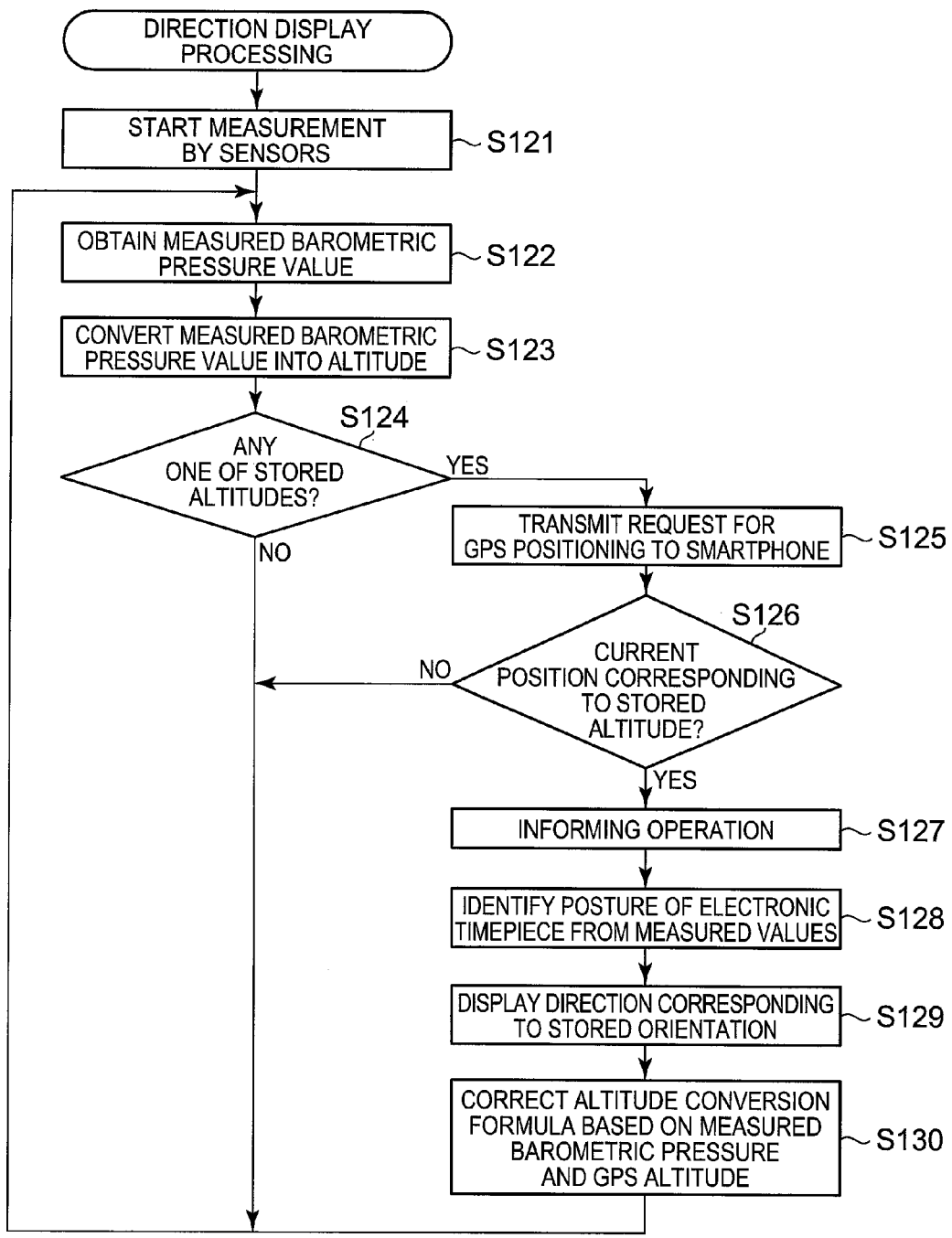
FIG. 6 is a flowchart illustrating a control procedure of direction display processing in the electronic timepiece according to the first embodiment.

FIG. 6 is a flowchart illustrating a control procedure of direction display processing according to the embodiment executed by the CPU 41 in the electronic timepiece 40. The direction display processing is started when the direction display program 422 is read out on the basis of a predetermined input operation by a user in the operation section 44 at the time of starting descending (down) a mountain and continuously executed.

The CPU 41 firstly starts sensor measurement by using the pressure sensor 56, the orientation sensor 58 and the acceleration sensor 60 (Step S121). Then, the CPU 41 obtains measured values of barometric pressure at predetermined time intervals according to the default setting or the operation by a user (Step S122), and converts the measured values into the altitude values by using the model atmospheric pressure table 421 and the correction parameter(s) (Step S123).

The CPU 41 judges whether or not the converted altitude value agrees with any one of the altitudes regarding the positional information stored in the measured-value log storage section 431 (Step S124). In this processing for judging whether or not they agree with each other, in view of possibility of measurement errors and/or convenience for a user, the altitude obtained by converting the barometric pressure does not need to completely agree with the altitude read out from the measured-value log storage section 431, and a difference can exist therebetween. A range (predetermined range) of the difference can be a range of ±10 meters, for example, in view of measurement error that may appear within equal widths in upper and lower directions, or can be a range extending in a plus direction in view of a situation of descending a mountain and/or in view of a difference between moving speeds when ascending a mountain and when descending a mountain. When judging that the converted altitude value does not agree with any one of the altitudes stored in the measured-value log storage section 431, the processing by the CPU 41 returns to Step S122.

When judging that the converted altitude value agrees with any of the altitudes regarding the positioning data stored in the measured-value log storage section 431, the CPU 41 extracts the positioning data determined to agree with the converted altitude value, and transmits the request for GPS positioning to the smartphone 10 through the Bluetooth module 48 (Step S125). At that time, in the smartphone 10, when the request for GPS positioning is received, the positional-information obtaining processing is started by reading out the positional-information transmission program 141 similarly to the case of the request in the measured-value registration processing, and the predetermined positioning data regarding the positioning result is transmitted to the electronic timepiece 40.

When receiving the positioning data obtained as the result of the GPS positioning from the smartphone 10, the CPU 41 judges whether or not the position/location based on the received positioning data agrees with the position/location based on the positioning data extracted in the processing of Step S125 (Step S126). Also in this case, the CPU 41 can perform the agreement judgment while taking account of not only complete agreement but also the acceptable difference (predetermined distance). The CPU 41 also can perform detailed settings for the acceptable difference depending on the positions of both spots, for example, depending on a positional relationship such as an inclination angle between the spots and a difference between the azimuth therebetween and the azimuth of the moving direction from the current position. When judging that the position of the received data does not agree with the position of the stored data, the processing by the CPU 41 returns to the Step S122.

When judging that the position of the received data agrees with the position of the stored data, the CPU 41 performs the informing operation (Step S127). As the informing operation, an operation(s) of any of the vibration motor 50, the LED 52 and the piezo element 54, or an operation of combination thereof is selected on the basis of the setting by a user. The CPU 41 then identifies the posture/orientation of the electronic timepiece 40 on the basis of the measured values of the acceleration sensor and the orientation sensor (Step S128), and causes the display section 46 to display the direction corresponding to the azimuth stored in the measured-value log storage section 431 depending on the posture/orientation of the electronic timepiece 40 (Step S129). After that, the CPU 41 sets the correction parameters for the conversion formula using the model atmospheric pressure table 421 on the basis of the GPS positioning altitude obtained from the smartphone 10 and the pressure value measured by the pressure sensor (Step S130). Then, the processing by the CPU 41 returns to the Step S122.

Incidentally, the display in the display section 46 can be performed when detecting the situation that a user notices the informing operation and sets the posture/orientation of the electronic timepiece 40 to the browsing state of the display section 46, or when detecting the situation that a user who notices the informing operation performs the predetermining operation in the operation section 44. In addition, the display in the display section 46 can be kept on for a predetermined time, or terminated on the basis of a predetermined operation by a user in the operation section 44.

Figure 7:
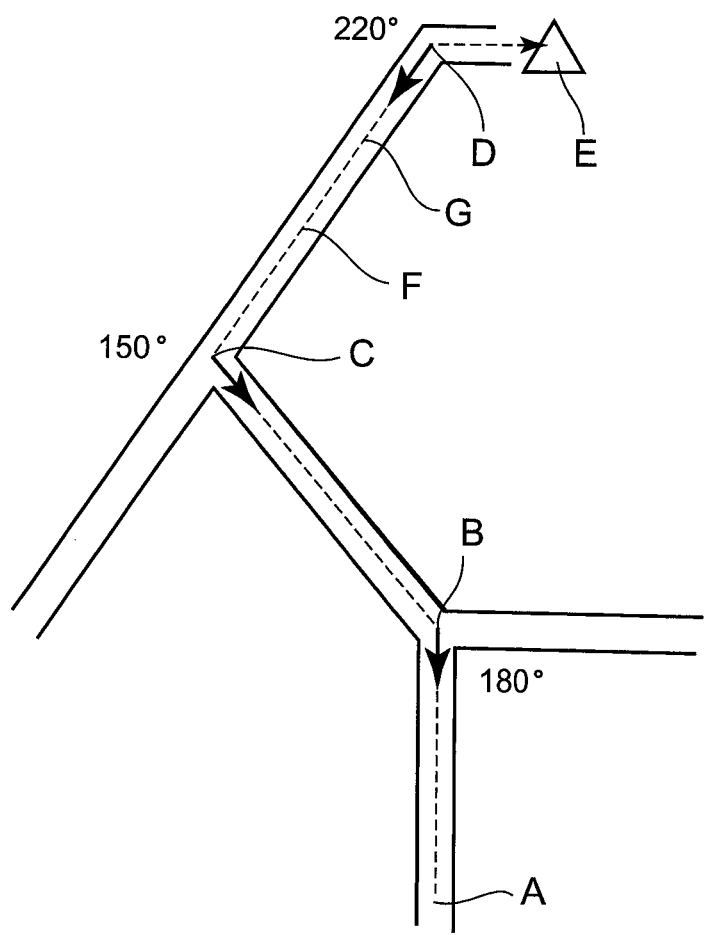
FIG. 7 is a diagram for explaining about specific examples of the measured-value registration processing and the direction display processing.

FIG. 7 is a diagram for explaining about specific examples of the measured-value registration processing and the direction display processing of the embodiment. There is herein described the case of traveling back and forth between the starting point of the climbing, namely spot A, and the summit, namely spot E, in the mountain climbing route as indicated with a broken line.

When the input operation is performed to obtain the measured values of the pressure sensor 56, the orientation sensor 58 and the acceleration sensor 60 (Step S101) and a user performs setting and operation to obtain the azimuth of the direction (arrowed direction) along which the user has climbed, namely, 180-degree direction with respect to the northerly direction (upward direction in FIG. 7) at spot B which is of a branching point, for example (Step S102), the request for the GPS positioning is transmitted to the smartphone 10 (Step S103) to obtain the positioning data, and this positioning data and the obtained azimuth are registered while they are correlated each other (Steps S102, S104). Similarly, the direction (150-degree direction) along the branch toward the valley route is registered at spot C which is of a junction between a ridge line and a traverse route, for example. Not only at the branching point of the climbing trail, but also at branching spot D between the official climbing trail and a side ridge (not illustrated) which is not of the climbing trail, a ridge line direction (220-degree direction) along which the climbing trail extends can be registered. In addition, at each of the registration spots, on the basis of the altitude obtained by the GPS positioning and the measured value obtained by the pressure sensor 56, the conversion formula for converting the measured value (barometric pressure) into the altitude value is continually corrected (Step S105).

When a user performs the operation to activate the direction display processing at the start of descending a mountain at spot E which is of the summit, the pressure sensor 56, the orientation sensor 58 and the acceleration sensor 60 start continuous measurements (Step S121). The digitally-sampled measured values of barometric pressure are obtained at the predetermined intervals (Step S122) to be converted into the altitude values (Step S123), and each converted altitude is compared with the altitude values regarding the positioning data stored in the measured-value log storage section 431 (Step S124). In the case that the agreement of the altitudes is detected when passing through each of spots D, C and B as the result of comparison, the request for GPS positioning is transmitted to the smartphone 10 (Step S125). When the spots compared with each other are determined to be the same position (Step S126: "YES") by comparing the positioning data received/obtained from the smartphone 10 with the positioning data corresponding to the detected (extracted) altitude value, the informing operation using the vibration motor 50, the LED 52 and/or the piezo element 54 is performed (Step S127), and the descending-mountain direction/orientation is displayed in the display section 46 (Steps S128, S129).

At that time, in the case that there is a saddle (or col) F between spot C and spot D, for example, when spot G existing between saddle F and spot D has the same altitude as that of spot C, it is detected that the altitude of spot G agrees with the altitude of spot C (Step S124: "YES"), and the request for GPS positioning is transmitted to the smartphone 10 (Step S125). However, because horizontal positions of spot G and spot C are determined to be different from each other (Step S126: "NO") on the basis of the positioning data received from the smartphone 10, the informing operation (Step S127) or the operation of the direction display (Steps S128, S129) is not performed.

Although in the above embodiment and specific examples the altitude values of all of the spots B, C and D are compared with the altitudes obtained based on the measurement by the pressure sensor 56 every time, such comparison and detection can be performed only at spot D when it is known that the planned route is same as the last route and in opposite direction thereto. After a user reaches spot D and the moving direction from that spot is indicated, such comparison and detection can be performed only at spot C. After a user reaches spot C and the moving direction from that spot is indicated, such comparison and detection can be performed only at spot B.

As described above, the direction display system 1 of the first embodiment is composed of the electronic timepiece 40 and the smartphone 10 which can perform near-field wireless communication with each other. The electronic timepiece 40 is equipped with the pressure sensor 56, the orientation sensor 58 and the acceleration sensor 60, which can continuously obtain the altitude with low power consumption, and which can obtain the azimuth value of the direction which is specified at the time of receiving the registration instruction from the operation section 44. The smartphone 10 is equipped with the GPS data receiving/processing section 26, and can intermittently performs the GPS positioning. When a user registers the orientation at an intended spot in mountain climbing, which orientation is of the direction that the user wishes to register, the electronic timepiece 40 obtains the GPS positioning data of the spot from the smartphone 10 and causes the measured-value log storage section 431 to sequentially store the pieces of GPS positioning data while correlating them to the registered orientation information. When descending a mountain, in the case that the altitude value obtained based on the measured value of the pressure sensor 56 becomes equal to the altitude value regarding the GPS positioning data stored in the measured-value log storage section 431, the electronic timepiece 40 obtains the current positional data of the GPS positioning data from the smartphone 10, and judges whether or not the current position/location agrees with the position/location of the GPS positional data stored in the measured-value log storage section 431. Only when it is judged that they agree with each other, the moving direction can be indicated by performing the direction display with respect to the orientation registered at the registration spot.

Thus, the location, the direction and the posture/orientation of the electronic timepiece 40 are ordinary measured by the operations of the pressure sensor 56, the orientation sensor 58 and the acceleration sensor 60, which can suppress power consumption. Accordingly, the size and weight of the electronic timepiece 40 can be reduced, and the electronic timepiece 40 does not become a strain in the case of being worn on a wrist or the like in mountain climbing. Meanwhile, when registering an intended direction, by invoking the smartphone 10 to obtain the current positional data based on the GPS positioning therefrom, the position registration can be surely performed without lowering accuracy of position measurement. This enables easily displaying the intended orientation data at the accurate position registered.

Since the smartphone 10 performs the GPS positioning only when a user wishes to obtain accurate positional data, also power consumption of the smartphone 10 can be reduced. Moreover, it becomes unnecessary to go to the trouble of taking out the smartphone 10 for browse thereof in a place where it is difficult to have a hand free, such as a mountain trail.

By registering the traveling direction for descending a mountain depending on the situation of actual movement/transfer at each spot or on the visually-confirmed situation while climbing a mountain, even in a place which is hard to be discriminated on a map, a user can obtain advantages of not losing a mountain descent direction, of not missing a mountain descent route, and of reducing a risk of going out of the mountain descent route. This can help a user to properly find the route at spots throughout a mountain trail, especially a route in the ridge line and/or rocky area where visibility is poor because of fog, a route for going around of the side of the great stone, a route for suddenly changing a course of climbing trail, a route including the spot in which there are confusing footprints to cause a climber to go off the right route, and a route where footprints are difficult to be found because of pile of fallen leaves, brake, and/or fallen snow.

All the processing using the GPS positioning data is executed in the electronic timepiece 40 by using the measured-value log storage section 431, and the smartphone 10 executes only the GPS positioning and transmission of the positioning data. This can avoid putting on the smartphone 10 an excess burden which is because of the other processes.

Since the measured-value registration processing in ascending a mountain is performed separately from the direction display processing in descending the mountain, it is unnecessary to execute unnecessary detecting processing regarding the direction display at the stage of performing registration processing in ascending the mountain.

Moreover, since the behaviors at the time of ascending a mountain and of descending the mountain are switched to each other on the basis of the operation of a user, it is possible to unfailingly perform switching from the measured-value registration processing to the direction display processing even in many climbing trails which include alternate up and down roads.

When the sequence of the spots to be detected is clear, for example when returning along the same route, it is possible to reduce an amount of processing by the CPU 41 by performing comparison/detection only to the positional data of the spot to be detected next.

Moreover, since the vibration motor 50, the LED 52, and the piezo element 54 are provided and the informing operation is performed by the intended way of a user when displaying the traveling direction in the direction display processing, it is possible to avoid the situation that a user does not notice the display and goes along a wrong direction.

Furthermore, since the parameter(s) for converting the measurement value of the pressure sensor 56 into the altitude value by using the model atmospheric pressure table 421 is corrected every time when obtaining the current positional information of the GPS positioning, highly accurate values can be obtained so as to follow a change of barometric pressure even when the barometric pressure changes in the middle of descending a mountain and it is difficult to obtain correct value(s) without correction.

[Variation]

Figure 8:
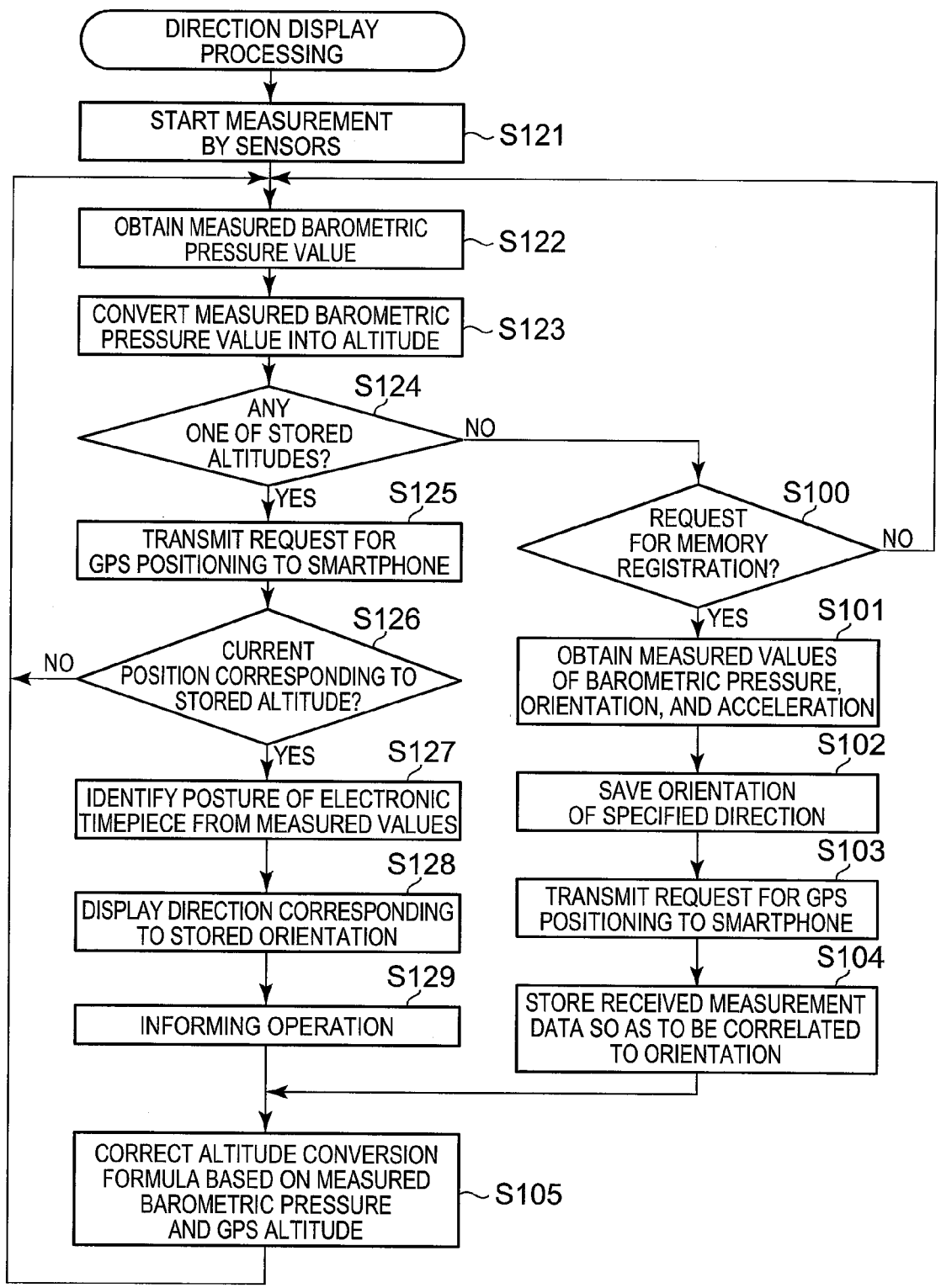
FIG. 8 is a flowchart illustrating a control procedure in a variation of the direction display processing.

FIG. 8 is a flowchart of variation of the direction display processing in the electronic timepiece 40 of the above embodiment.

In the direction display processing of the variation, the measured-value registration processing at the time of ascending a mountain and the direction display processing at the time of descending the mountain are not distinguished from each other and are concurrently executed. Concretely, in the direction display processing of the variation, when the result of the processing in Step S124 in the direction display processing of the above embodiment is "NO", the CPU 41 judges whether or not memory registration has been requested by the input operation in the operation section 44 (Step S100). When judging that the memory registration has been requested, the control procedure performs the processing of Steps S101 to S105 of the measured-value registration processing. Processes in the other steps excepting Step S100 are similar to those of the above embodiment, and thereby same numerals are used and the descriptions thereof are omitted.

In the direction display processing of the variation, in order to prevent determining that the same spot as the certain spot is detected in the determining processing of Step S124 immediately after the positioning data and the azimuth at the certain spot are registered, it is possible to perform setting for avoiding causing the altitude to be a subject of detection until a predetermined time has been passed or until once it is judged that the movement/transfer of a predetermined altitude difference has been performed.

Thus, by collectively performing the registration processing and the display processing without separating these processes from each other in ascending and descending routes, the direction display can be performed so as to flexibly correspond to the case of including not only a mere back-and-forth route but also a go-around route, drop-by route, etc.

Second Embodiment

Next, a direction display system 1 according to a second embodiment will be described.

The internal configuration of the electronic timepiece 40 constituting the direction display system 1 of the second embodiment is same as that of the electronic timepiece 40 of the first embodiment, and the description thereof is omitted.

Figure 9:
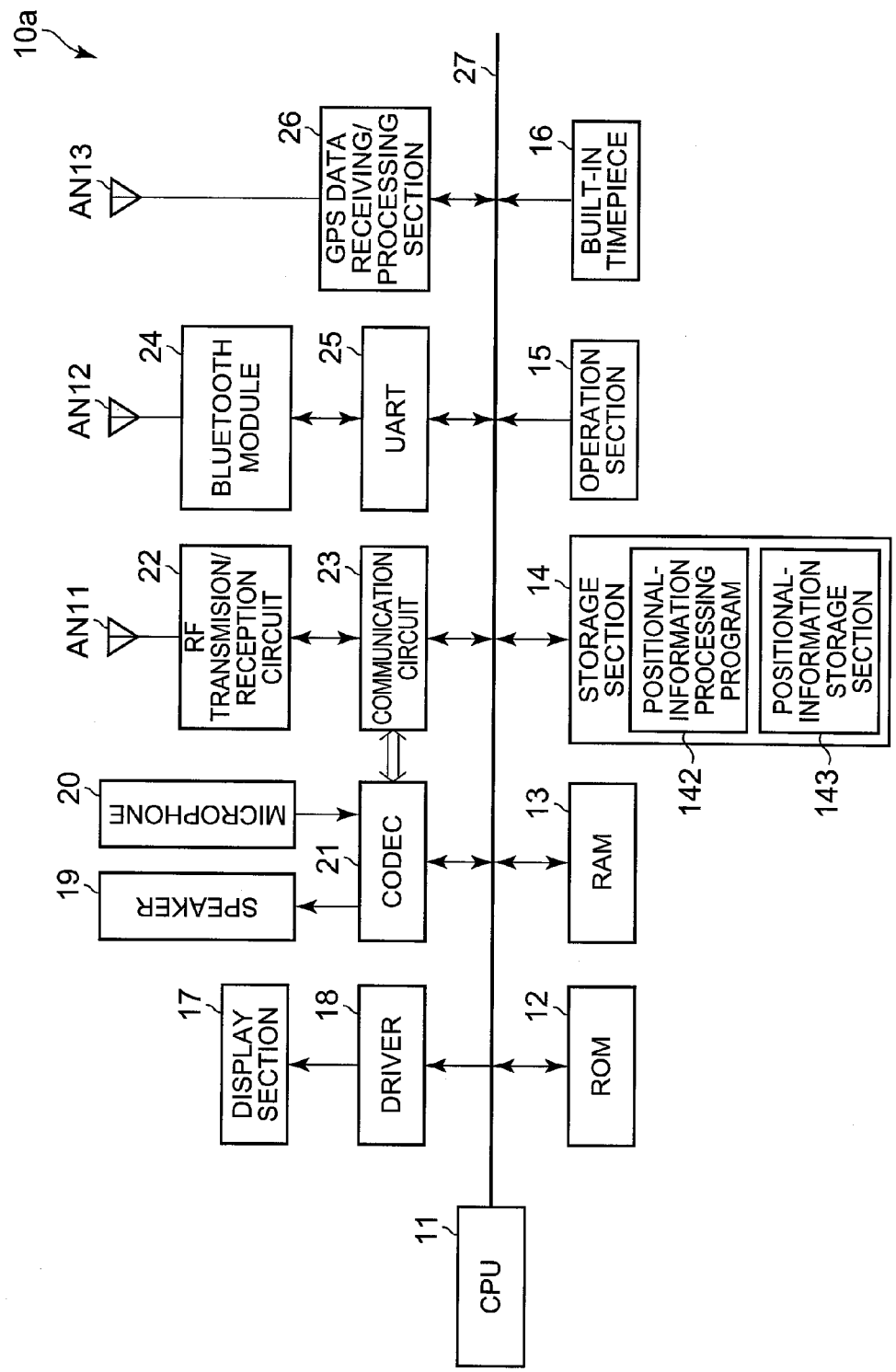
FIG. 9 is a block diagram illustrating an internal configuration of a smartphone according to a second embodiment.

FIG. 9 is a block diagram illustrating the internal configuration of the smartphone 10a constituting the direction display system 1 of the second embodiment.

The smartphone 10a of the second embodiment is same as the smartphone 10 of the first embodiment excepting that the smartphone 10a stores a positional-information processing program 142 and a positional-information storage section 143 in the storage section 14 in stead of the positional-information transmission program 141 stored by the storage section 14 of the smartphone 10, and thereby same numerals are used and the descriptions thereof are omitted.

Next, a direction display operation in the direction display system 1 of the second embodiment will be described.

Figure 10:
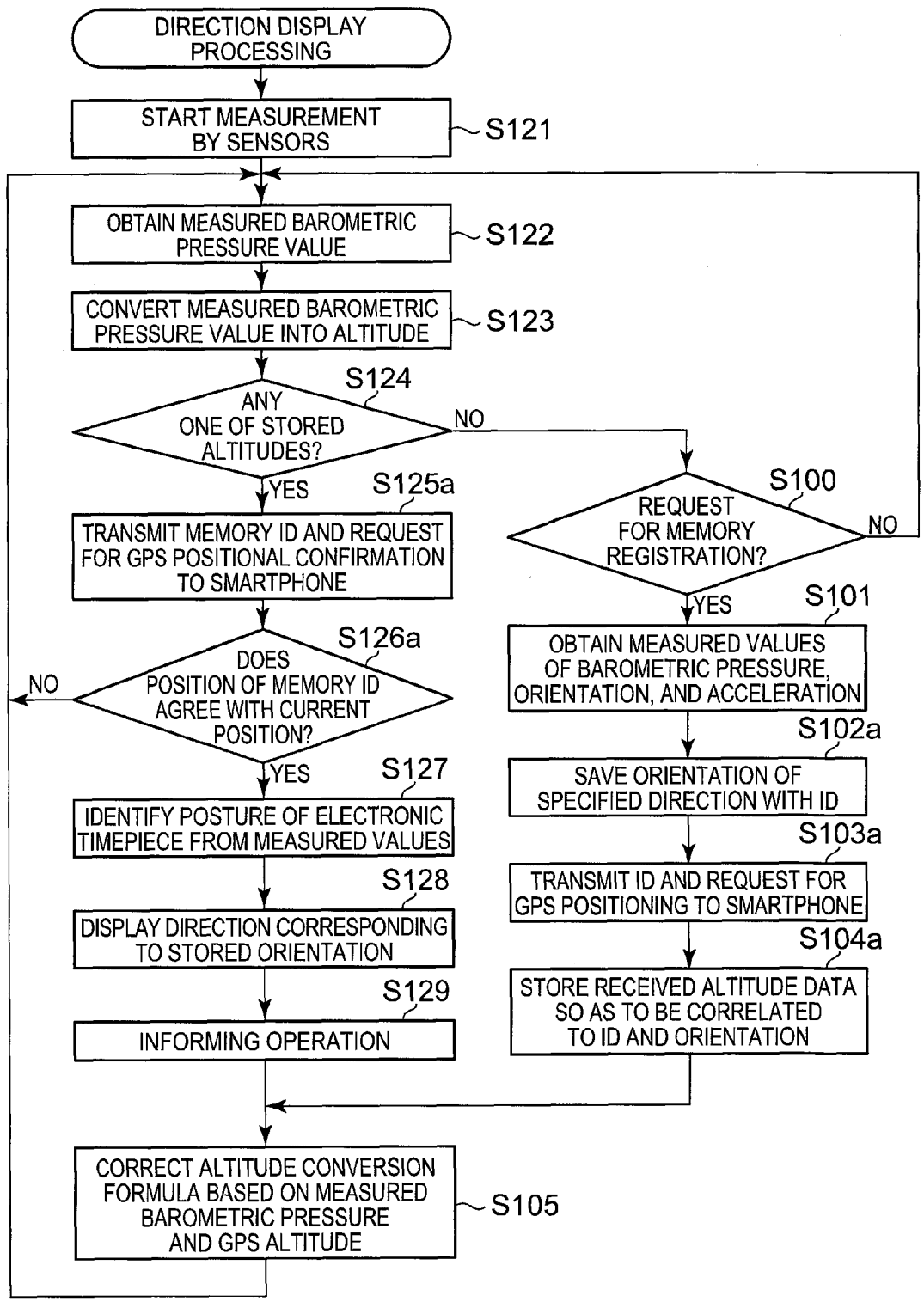
FIG. 10 is a flowchart illustrating a control procedure of a direction display processing in an electronic timepiece according to the second embodiment.
Figure 11A:
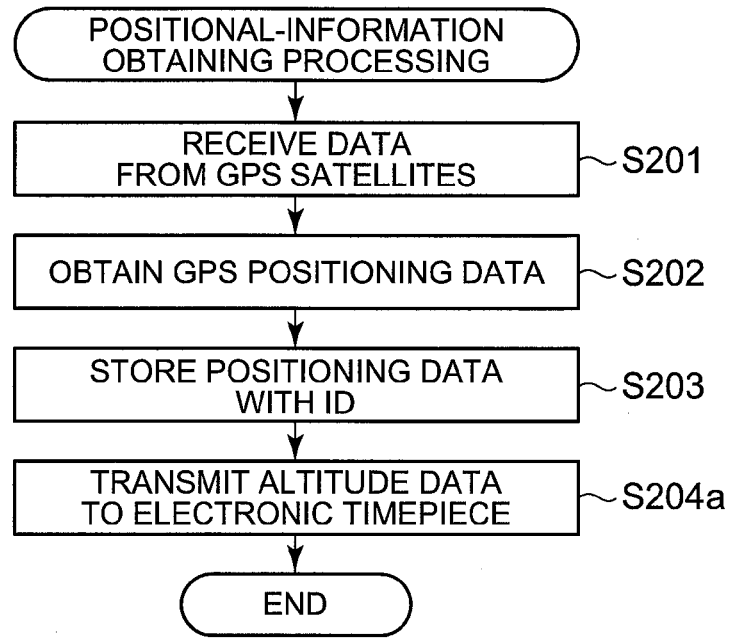
FIGS. 11A and 11B are flowcharts illustrating control procedures of positional-information obtaining processing and positional-information comparing processing in the smartphone according to the second embodiment.
Figure 11B:
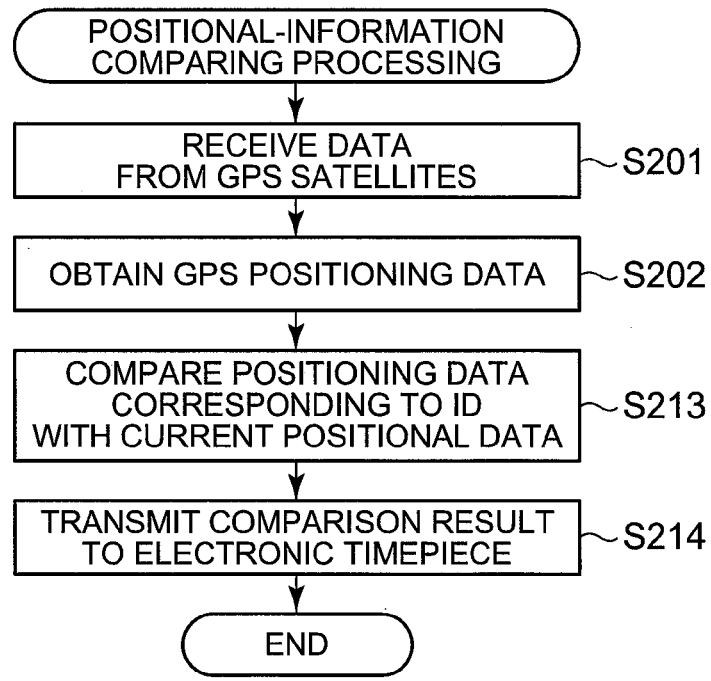

FIG. 10 is a flowchart illustrating a control procedure of the direction display processing to be executed by the CPU 41 in the electronic timepiece 40 in the direction display system 1 of the second embodiment. FIGS. 11A and 11B are flowcharts illustrating control procedures of the positional-information obtaining processing and positional-information comparing processing to be executed by the CPU 11 in the smartphone 10*a* in the direction display system 1 of the second embodiment.

The direction display processing to be executed in the electronic timepiece 40 of the second embodiment is same as the direction display processing of the above variation excepting that processes of Steps S125, S126, S102 to S104 are changed to Steps S125*a*, S126*a*, S102*a* to S104*a*, and thereby same numerals are used and the detailed descriptions thereof are omitted.

In the smartphone 10*a* of the second embodiment, when the GPS positioning has been requested in Step S103*a*, the positional-information obtaining processing is executed by the positional-information processing program 142 read out from the storage section 14. In the positional-information obtaining processing, processing of Step S203 is added to the positional-information obtaining processing of the first embodiment, and processing of Step S204*a* is performed in stead of processing of Step S204. When the request of Step S125*a* has been received, the smartphone 10*a* executes the positional-information comparing processing by using the positional-information processing program 142, and Steps S213 and S214 are performed in stead of Step S204 of the positional-information obtaining processing of the first embodiment. The other processing is same as those of the first embodiment, and thereby same numerals are used and the detailed descriptions thereof are omitted.

In the direction display processing in the electronic timepiece 40 of the second embodiment, as illustrated in FIG. 10, when the result of processing of Step S100 is "YES" and the measurement values of barometric pressure, direction/orientation, and acceleration are obtained (Step S101), the CPU 41 newly sets an ID value for specifying the data and causes the measured-value log storage section 431 to store the azimuth of the specified direction with the ID value (Step S102*a*). Then, the CPU 41 transmits the request for GPS positioning with the set ID value to the smartphone 10*a* through the Bluetooth module 48 (Step S103*a*). When receiving only the altitude data as the current positional information from the smartphone 10*a*, the CPU 41 causes the measured-value log storage section 431 to store the altitude data while correlating the same with the previously-stored ID value (Step S104*a*).

When the smartphone 10*a* receives the request for GPS positioning transmitted in processing of Step S103*a*, the CPU 11 of the smartphone 10*a* starts the positional-information obtaining processing as illustrated in FIG. 11A. The CPU 11 receives radio wave from the GPS satellite(s) (Step S201), and when obtaining the GPS positioning data (Step S202), causes the positional-information storage section 143 to store the received ID value and the positioning data while correlating them to each other (Step S203). Then, the CPU 11 transmits, as the current positional information, only the altitude data among the positioning result to the electronic timepiece 40 through the Bluetooth module 24 (Step S204*a*). After that, the CPU 11 terminates the positional-information obtaining processing.

Then, in the direction display processing controlled by the CPU 41 of the electronic timepiece 40, when the result of processing of Step S124 is "YES", as illustrated in FIG. 10, the CPU 41 transmits the request for GPS positional confirmation, with the ID value corresponding to the extracted altitude value (registered positional information), to the smartphone 10*a* through the Bluetooth module 48 (Step S125*a*). The CPU 41 merely receives the comparison result from the smartphone 10*a*. Here, the CPU 41 obtains the judgment result on whether or not the current position measured by the GPS positioning agrees with the positioning data correlated to the memory ID value and stored in the positional-information storage section 143 of the smartphone 10*a* within the difference of a predetermined range, and confirms the content of judgment result (Step S126*a*). When judging that they agree with each other, the processing by the CPU 41 proceeds to Step S127, and when judging that they do not agree with each other, the processing by the CPU 41 returns to Step S122.

When smartphone 10*a* receives the request for GPS positional confirmation transmitted in the processing of Step S125*a*, the CPU 11 of the smartphone 10*a* executes the positional-information comparing processing. As illustrated in FIG. 11B, the CPU 11 receives radio wave from the GPS satellite (Step S201), and when obtaining the GPS positioning data (Step S202), the CPU 11 compares this GPS positioning data with the positioning data stored in the positional-information storage section 143 correspondingly to the ID value transmitted with the request for GPS positional confirmation from the electronic timepiece 40, and judges whether or not they are agree with each other within the difference of a predetermined range (Step S213). Then, the CPU 11 transmits the comparison result as a binary signal indicating "YES" or "NO" to the electronic timepiece 40 (Step S214). After that, the CPU 11 terminates the positional-information comparing processing.

As described above, according to the direction display system 1 of the second embodiment, three-dimensional positional data obtained by the GPS positioning by the smartphone 10 is stored in the positional-information storage section 143 when registering the moving direction data, and among the pieces of data, only altitude-directional data is transmitted to the electronic timepiece 40 to be stored in the measured-value log storage section 431. Then, when the altitude obtained by conversion in the extracting processing regarding the direction display by the electronic timepiece 40 agrees with the registered altitude, after the smartphone 10 executes all of the positional-agreement judging processing, only the judgment result is returned to the electronic timepiece 40. Thus, since the smartphone 10 does not need to transmit unnecessary data for the electronic timepiece 40, communications traffic can be reduced and electric power and/or time for communication can be suppressed. In addition, storage capacity necessary for the electrical timepiece 40 can be reduced.

The present invention is not limited to the above embodiments, and various changes can be added thereto.

For example, though the above embodiments identify the posture/orientation of the electrical timepiece 40 by using the acceleration sensor 60 to perform the direction measurement and/or the display, it is also possible to perform the measurement and/or display without using the acceleration sensor 60 on the premise that a user disposes the electronic timepiece 40 in a predetermined posture/orientation.

The above embodiments describe the configuration in which the measured-value registration processing and the direction display processing are completely separated from each other and the configuration in which they are executed concurrently, but the present invention can adopt a configuration which does not belong to these configurations. For example, it is possible to cause only the measured-value registration processing to be executed by the middle of processing and then cause the measured-value registration processing and the direction display processing to be executed concurrently.

Moreover, the above embodiments describe the configuration in which the electronic timepiece 40 holds and utilizes all of the positioning data (current positional information) measured by the GPS positioning, and the configuration in which the smartphone 10 holds and utilizes the data of horizontal-directional position among the pieces of the current positional information measured by the GPS positioning, but the present invention can adopt another configuration. For example, it is possible to cause the measured-value log storage section 431 to store/hold the data, and to send back the registered positional information, which has been extracted in the registration position extracting section, to the smartphone 10 so as to be compared with the GPS positioning result to perform the agreement judgment.

In the above embodiments, a bit of difference is allowed when executing the processing of agreement judgment of the altitude and/or current position/location (Steps S124 and S126). In this case, however, when the set difference is large or when there is a continuous road including up and down minutely repeated, and when registrations has been performed successively at spots adjacent to one another, there is a possibility that a plurality of registration spots are mistakenly detected, especially in a complicated climbing trail such as a zigzag road. In such case, it is possible to concurrently display the directions which have been registered in the plural spots, or display the direction which has been registered in the nearer spot or the direction which has been registered later. When displaying the plural directions concurrently, it is also possible to perform displaying so that the direction registered in the nearer spot or the direction at the spot registered later can be distinguished from the direction registered in another spot by using a different display system (for example, by allowing the displayed direction to blink). In any case, the display data of the direction registered at a remote spot can be eliminated.

Furthermore, though only one moving direction is registered with respect to the positional registration spot in the embodiment, when plural registrations have been executed within the allowed difference and/or in the condition of judgment distance, a plurality of moving directions can be registered sequentially with respect to one spot. Alternatively, it is possible to perform setting change for such spot so that the allowed difference and/or judgment distance becomes relatively small.

Although the combination of the electronic timepiece 40 and the smartphone 10 is described as the cited example in the embodiment, the present invention is not limited thereto. For example, a dedicated GPS logger and/or positioning device can be used in stead of the smartphone 10. In such case, the data obtained in the ordinary operation of GPS positioning can be directly acquired by the electronic timepiece 40 to be used therein, and the electronic timepiece 40 does not need to request the GPS positioning separately. The present invention can be applied to not only the electronic timepiece 40 but also another wrist-wearing-type electronic device such as a pedometer. The electronic device is not limited to the wrist-wearing-type one as long as it is usable in a climbing trail or the like, and as long as it is portable electronic device easily browsed, for example, by being dangled from a neck.

Moreover, the Bluetooth is cited as the example of the way of the near-field wireless communication, but the way is not limited thereto. It can be another way, for example, infrared communication, Ultra Wide Band (UWB), etc.

The details of numerical values, configuration, control procedure, etc. illustrated in the above embodiments and/or variation can be arbitrary changed without departing from the spirit of the present invention.

The embodiments of the present invention are described above, but the scope of the present invention is not limited to the abovementioned embodiments and includes the scope of the invention described in the claims and the scope of the equivalents thereof.

What is claimed is:

1. A direction display device comprising:
  a wireless communication section to perform near field wireless communication with an external device;
  a barometric pressure measuring section to measure barometric pressure;
  a converting section to convert the barometric pressure measured by the barometric pressure measuring section into an altitude value;
  an orientation measuring section to measure an orientation of a specified direction;
  an operation section to receive an input operation;
  a display section to display information;
  a registration controlling section to obtain current positional information by the wireless communication section from an external positioning device to store the current positional information as registered positional information while correlating the current positional information to registered orientation information which is of the measured orientation, when the input operation of registration instruction of measured orientation has been detected;
  a registration position extracting section to extract the registered positional information according to which a difference between the altitude value converted by the converting section and an altitude value obtained from the registered positional information stored is within a predetermined range; and
  a display controlling section to cause, when one or more pieces of the registered positional information has been extracted by the registration position extracting section, the display section to indicate a direction regarding the registered orientation information stored so as to be correlated to the registered positional information, according to the current position measured by the positioning device and a position regarding the registered positional information extracted.

2. The direction display device according to claim 1 further comprising:
  a storage section to store the registered orientation information which is of the measured orientation, wherein
  the display controlling section includes:
    a position agreement judging section to obtain the current positional information by the wireless communication section from the positioning device, to calculate a distance between the current position regarding the current positional information and the position regarding the registered positional information extracted, and to judge whether or not the calculated distance is within a predetermined distance; and
    a direction display controlling section to cause, when the position agreement judging section judges that the calculated distance is within the predetermined distance, the display section to indicate the direction regarding the registered orientation information stored so as to be correlated to the registered positional information for which the judgment has been performed.

3. The direction display device according to claim 2 further comprising:
  an input/output switch controlling section to selectively drive any one of a registration instruction detecting section to detect the input operation of registration instruction of the measured operation and the registration position extracting section.

4. The direction display device according to claim 3, wherein
the input/output switch controlling section performs switching on the basis of a predetermined input operation in the operation section.

5. The direction display device according to claim 2 further comprising:
an informing section to execute a predetermined informing operation, wherein
the display controlling section causes the informing section to execute the predetermined informing operation when causing the display section to indicate the direction.

6. The direction display device according to claim 2, wherein
the converting section corrects a parameter related to conversion on the basis of the altitude value regarding the current positional information and the barometric pressure measured by the barometric pressure measuring section, every time when the current positional information is obtained from the positioning device.

7. The direction display device according to claim 1, wherein
the display controlling section includes:
a position confirming section to obtain a judgment result on whether or not a subject distance between the current position and the position regarding the registered positional information extracted is within a predetermined distance by the wireless communication section from the positioning device; and
a direction display controlling section to indicate, when the position confirming section has judged that the subject distance is within the predetermined distance, the direction regarding the registered orientation information stored so as to be correlated to the registered positional information for which the judgment has been performed.

8. The direction display device according to claim 7 further comprising:
an input/output switch controlling section to selectively drive any one of a registration instruction detecting section to detect the input operation of registration instruction of the measured operation and the registration position extracting section.

9. The direction display device according to claim 8, wherein
the input/output switch controlling section performs switching on the basis of a predetermined input operation in the operation section.

10. The direction display device according to claim 7 further comprising:
an informing section to execute a predetermined informing operation, wherein
the display controlling section causes the informing section to execute the predetermined informing operation when causing the display section to indicate the direction.

11. The direction display device according to claim 7, wherein
the converting section corrects a parameter related to conversion on the basis of the altitude value regarding the current positional information and the barometric pressure measured by the barometric pressure measuring section, every time when the current positional information is obtained from the positioning device.

12. The direction display device according to claim 1 further comprising:
an input/output switch controlling section to selectively drive any one of a registration instruction detecting section to detect the input operation of registration instruction of the measured operation and the registration position extracting section.

13. The direction display device according to claim 12, wherein
the input/output switch controlling section performs switching on the basis of a predetermined input operation in the operation section.

14. The direction display device according to claim 13, wherein
only when the difference is within a predetermined range, the difference being between the converted altitude value and the altitude value obtained from the latest registered positional information among the pieces of the registered positional information correlated to the registered orientation information for which the direction has not been indicated by the display section, the registration position extracting section extracts the registered positional information.

15. The direction display device according to claim 12, wherein
only when the difference is within a predetermined range, the difference being between the converted altitude value and the altitude value obtained from the latest registered positional information among the pieces of the registered positional information correlated to the registered orientation information for which the direction has not been indicated by the display section, the registration position extracting section extracts the registered positional information.

16. The direction display device according to claim 1 further comprising:
an informing section to execute a predetermined informing operation, wherein
the display controlling section causes the informing section to execute the predetermined informing operation when causing the display section to indicate the direction.

17. The direction display device according to claim 1, wherein
the converting section corrects a parameter related to conversion on the basis of the altitude value regarding the current positional information and the barometric pressure measured by the barometric pressure measuring section, every time when the current positional information is obtained from the positioning device.

18. A direction display system comprising:
a positioning device which includes:
an external communication section to perform near field wireless communication with an external device;
a positioning section to receive radio wave from a plurality of positioning satellites to measure a current position; and
a positioning controlling section to control a timing of measurement by the positioning section and to control transmission/output of the current positional information related to a result of the measurement; and
the direction display device according to claim 1, wherein
the positioning controlling section causes the external communication section to transmit the current positional information related to the result of the measurement by the positioning section to the direction display device, according to a request from the direction display device received by the external communication section.

19. The direction display system according to claim 18, wherein the positioning controlling section causes the positioning section to measure the current position every time when the request from the direction display device is received, and causes the external communication section to transmit the current positional information related to the result of the measurement to the direction display section.

20. The direction display system according to claim 18, wherein the positioning device further includes:
an external storage section to store the current position measured by the positioning section,
the positioning controlling section includes: a first positioning controlling section which controls an operation in the case that the request of the registration controlling section is received from the direction display section; and a second positioning controlling section which controls an operation in the case that the request of the display controlling section is received from the direction display section,
when the input operation of registration instruction has been detected, the registration controlling section sets identification information to the registration instruction and transmits the identification information to the positioning device,
the first positioning controlling section causes the external storage section to store the current position measured by the positioning device while correlating the current position to the identification information, and causes the external communication section to transmit only altitude information as the current positional information,
the registration controlling section stores the registered orientation information and the altitude information obtained as the registered positional information from the positioning device while correlating the registered orientation information and the altitude information to the identification information,
the display controlling section causes, when the registration position extracting section extracts one or more pieces of the registered positional information, the wireless communication section to transmit a request for current positional confirmation with the identification information correlated to the registered positional information extracted to the positioning device,
the second positioning controlling section judges whether or not a distance between the current position measured by the positioning section and the current position stored in the external storage section so as to be correlated to the received identification information is within a predetermined distance, and causes the external communication section to return a confirmation result on the basis of the judgment result in response to the request for current positional confirmation, and
the display controlling section determines whether or not the display section displays the direction regarding the registered orientation information on the basis of the confirmation result obtained from the positioning device.

* * * * *